(12) United States Patent
Ali et al.

(10) Patent No.: US 7,128,370 B2
(45) Date of Patent: Oct. 31, 2006

(54) VEHICLE SEAT ASSEMBLY HAVING A VEHICLE OCCUPANT SENSING SYSTEM AND REINFORCING INSERTS POSITIONED THEREIN

(75) Inventors: Asad Ali, Troy, MI (US); Oliver Young, Grosse Pointe Farms, MI (US)

(73) Assignee: Lear Corporation, Southfield, MI (US)

( * ) Notice: Subject to any disclaimer, the term of this patent is extended or adjusted under 35 U.S.C. 154(b) by 162 days.

(21) Appl. No.: 10/749,073

(22) Filed: Dec. 30, 2003

(65) Prior Publication Data

US 2004/0262959 A1    Dec. 30, 2004

Related U.S. Application Data

(63) Continuation-in-part of application No. 10/606,649, filed on Jun. 26, 2003.

(51) Int. Cl.
*B60N 2/00* (2006.01)

(52) U.S. Cl. .................................. 297/217.3

(58) Field of Classification Search ............. 297/217.3, 297/216.1, 452.18, 463.1, 216.18
See application file for complete search history.

(56) References Cited

U.S. PATENT DOCUMENTS

| | | | | |
|---|---|---|---|---|
| 2,708,005 A | * | 5/1955 | Gazzo | 180/273 |
| 5,129,706 A | * | 7/1992 | Ghezzi | 297/216.1 |
| 5,404,128 A | | 4/1995 | Ogino et al. | 340/425.5 |
| 5,413,378 A | | 5/1995 | Steffens, Jr. et al. | 280/735 |
| 5,474,327 A | | 12/1995 | Schousek | 280/735 |
| 5,485,000 A | | 1/1996 | Schneider | 235/494 |
| 5,570,903 A | | 11/1996 | Meister et al. | 280/735 |
| 5,594,222 A | | 1/1997 | Caldwell | 200/600 |
| 5,653,462 A | | 8/1997 | Breed et al. | 280/735 |
| 5,694,320 A | | 12/1997 | Breed | 364/424.055 |
| 5,731,781 A | | 3/1998 | Reed | 342/135 |
| 5,739,757 A | * | 4/1998 | Gioutsos | 340/667 |
| 5,748,473 A | | 5/1998 | Breed et al. | 364/424.055 |
| 5,810,392 A | | 9/1998 | Gagnon | 280/735 |
| 5,822,707 A | | 10/1998 | Breed et al. | 701/49 |
| 5,829,782 A | | 11/1998 | Breed et al. | 280/735 |
| 5,835,613 A | | 11/1998 | Breed et al. | 382/100 |
| 5,848,802 A | | 12/1998 | Breed et al. | 280/735 |
| 5,877,677 A | | 3/1999 | Fleming et al. | 340/436 |
| 5,890,758 A | | 4/1999 | Pone et al. | 297/15 |
| 5,901,978 A | | 5/1999 | Breed et al. | 280/735 |
| 5,931,254 A | | 8/1999 | Loraas et al. | 180/272 |
| 5,931,527 A | | 8/1999 | D'Onofrio et al. | 297/146 |
| 5,943,295 A | | 8/1999 | Varga et al. | 367/99 |
| 5,954,398 A | | 9/1999 | Namba et al. | 297/257 |

(Continued)

FOREIGN PATENT DOCUMENTS

EP   0 689 967 A1   3/1996

(Continued)

*Primary Examiner*—Milton Nelson, Jr.
(74) *Attorney, Agent, or Firm*—Bill Panagos

(57) ABSTRACT

A vehicle seat assembly including a lower seat cushion with an upper surface and a lower surface. The vehicle seat assembly also has a plurality of sensor assemblies positioned adjacent the lower surface of the lower seat cushion. The sensor assemblies are responsive to a condition of the lower seat cushion. The vehicle seat assembly also has at least one reinforcing insert disposed between at least one of the sensor assemblies and the lower surface of the lower seat cushion. The reinforcing insert protects the lower seat cushion by more evenly distributing pressure from the sensor assemblies onto the lower seat cushion to prevent premature wear and maintain comfort over the course of its operating lifetime.

17 Claims, 3 Drawing Sheets

U.S. PATENT DOCUMENTS

| | | | |
|---|---|---|---|
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,039,344 A * | 3/2000 | Mehney et al. | 280/735 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,106 A * | 7/2000 | Patel et al. | 73/862.582 |
| 6,089,641 A | 7/2000 | Mattarella et al. | 296/64 |
| 6,092,838 A * | 7/2000 | Walker | 280/735 |
| 6,101,436 A | 8/2000 | Fortune et al. | 701/45 |
| 6,102,463 A | 8/2000 | Swanson et al. | 296/37.15 |
| 6,113,139 A * | 9/2000 | Heximer et al. | 280/735 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B1 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,371,552 B1 * | 4/2002 | Narita et al. | 297/180.12 |
| 6,393,133 B1 | 5/2002 | Breed et al. | 382/100 |
| 6,394,490 B1 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,428,095 B1 * | 8/2002 | Hirata | 297/217.3 |
| 6,442,465 B1 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B1 | 1/2003 | Babala et al. | 439/248 |
| 6,605,877 B1 | 8/2003 | Patterson et al. | 307/10.1 |
| 6,609,054 B1 | 8/2003 | Wallace | 701/45 |
| 6,609,752 B1 * | 8/2003 | Inoue | 297/217.3 |
| 6,661,341 B1 * | 12/2003 | Masuda et al. | 340/562 |
| 6,739,673 B1 * | 5/2004 | Gupta et al. | 297/452.65 |
| 6,849,707 B1 * | 2/2005 | Baek et al. | 528/423 |
| 2002/0000742 A1 * | 1/2002 | Wato et al. | 297/216.1 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/45 |
| 2003/0071479 A1 | 4/2003 | Schaller et al. | 296/136 |
| 2003/0090133 A1 | 5/2003 | Nathan et al. | 297/217.3 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al. | 702/173 |
| 2005/0017564 A1 * | 1/2005 | Kayumi | 297/378.1 |

FOREIGN PATENT DOCUMENTS

WO     WO 98/41424     3/1997

* cited by examiner

ND REINFORCING INSERTS POSITIONED
VEHICLE SEAT ASSEMBLY HAVING A VEHICLE OCCUPANT SENSING SYSTEM AND REINFORCING INSERTS POSITIONED THEREIN

CROSS-REFERENCE TO RELATED APPLICATIONS

This application is a continuation-in-part of U.S. Ser. No. 10/606,649, entitled "Encapsulated Spring Sensor Assembly" and filed Jun. 26, 2003.

BACKGROUND OF THE INVENTION

1. Field of the Invention

The present invention relates generally to a vehicle seat assembly, and more particularly to a vehicle seat assembly having a vehicle occupant sensing system and reinforcing inserts positioned therein.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt extending diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that are capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant.

It can be appreciated that these occupant sensing systems provide valuable data, allowing the vehicle safety systems to function more effectively to reduce injuries to vehicle occupants.

One necessary component included in the occupant sensing systems discussed above is a means for sensing a condition of the vehicle seat, such as whether or not the seat is occupied or whether the occupant is seated in a certain position. The sensing means is often positioned under or within the lower seat cushion, and the sensing means can include components made from a hard material. In contrast, the vehicle seat is usually filled with a soft, pliable foam cushion, and the vehicle seat is typically covered with a fabric or leather trim. Weight loading from the occupant presses the soft cushion into the hard sensing means. Over time, the cushion and possibly the trim of the vehicle seat can prematurely wear due to repeated loading from the harder material of the sensing means. This is especially true of the inboard and outboard sides of the vehicle seat because there is less foam thickness in those areas and because they bear most of the load when the occupant gets in and out of the vehicle. Once the foam of the seat cushion begins to wear, the occupant is more likely to feel the sensing means through the cushion, and this can make sitting on the vehicle seat uncomfortable.

Therefore, there is an ongoing need in the art for a vehicle seat assembly that is reinforced to inhibit premature wear and discomfort caused by the sensing means positioned within the seat assembly.

SUMMARY OF THE INVENTION

Accordingly, the present invention is a vehicle seat assembly including a lower seat cushion with an upper surface and a lower surface. The vehicle seat assembly also has a plurality of sensor assemblies positioned adjacent the lower surface of the lower seat cushion. The sensor assemblies are responsive to a condition of the lower seat cushion. The vehicle seat assembly also has at least one reinforcing insert disposed between at least one of the sensor assemblies and the lower surface of the lower seat cushion.

One advantage of the present invention is that the reinforcing insert protects the lower seat cushion by more evenly distributing pressure from the sensor assemblies onto the lower seat cushion. As such, the lower seat cushion is less likely to prematurely wear and is thus more likely to remain comfortable to sit upon over the course of its operating lifetime.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
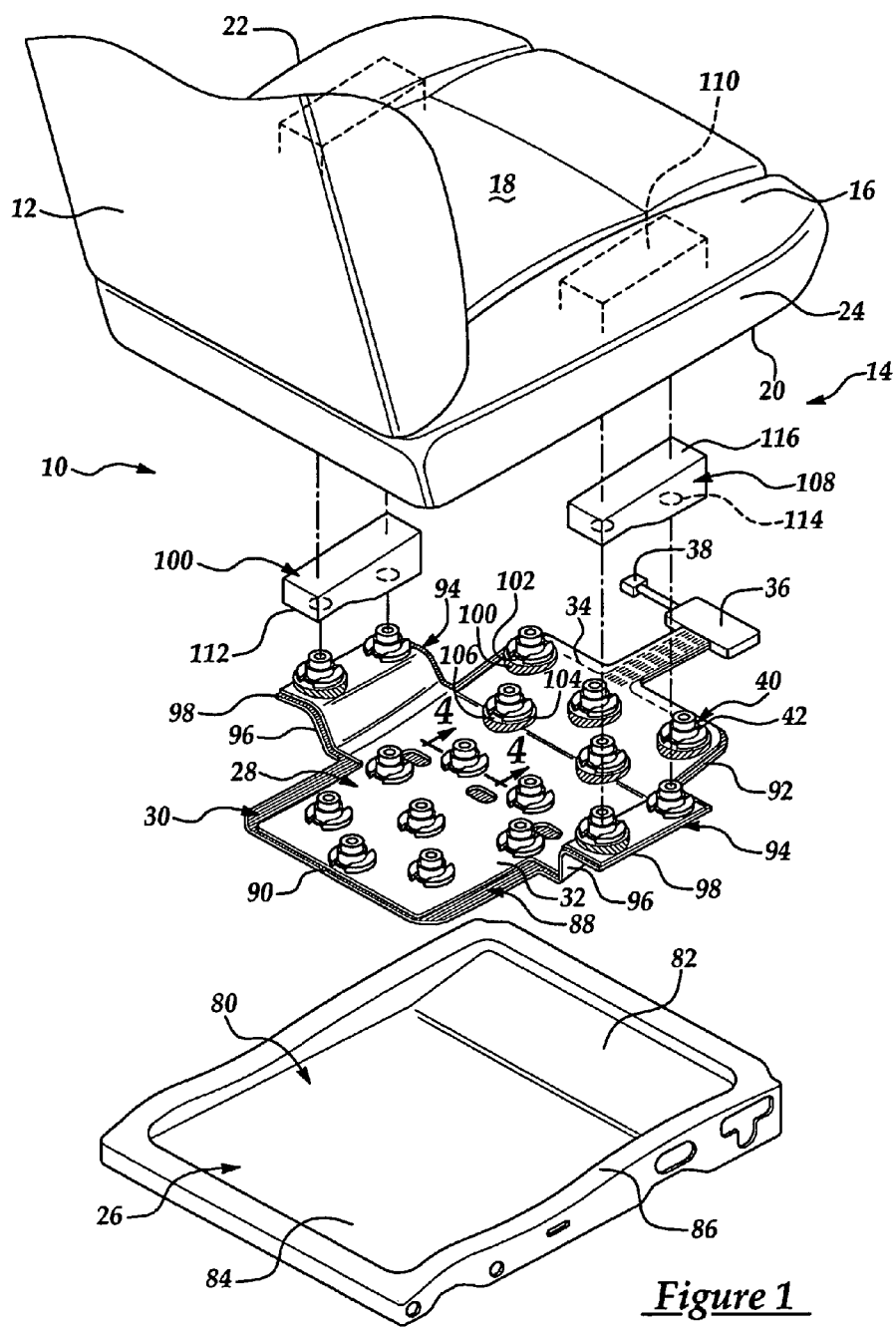
FIG. 1 is an exploded top perspective view of a vehicle seat assembly having reinforcement inserts positioned therein.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, whether the occupant is above or below a certain weight requirement or whether the occupant is sitting in a certain position.

The sensing system 28 includes a circuit carrier tray, generally indicated at 30, that is supported by the seat pan 26. The tray 30 supports components of the vehicle occupant sensing system 28 as will be described in greater detail below. The vehicle occupant sensing system 28 also includes a circuit carrier 32, which is disposed adjacent the lower surface 20 of the seat cushion 16. The tray 30 supports the circuit carrier 32. In addition, the vehicle occupant sensing system 28 includes an electric circuit 34, which in turn, is supported by the circuit carrier 32. The circuit carrier 32 is made of a thin nonconductive and corrosion-resistant material, and it encapsulates known electrical components that form the electric circuit 34. For instance, in one embodiment, a flexible printed circuit forms the circuit carrier 32 and electric circuit 34.

The electric circuit 34 is electrically connected to a controller schematically illustrated at 36. As described in greater detail below, the electric circuit 34 carries electric signals generated by the vehicle occupant sensing system 28 to the controller 36. The controller 36 is electrically attached to a restraint system, schematically illustrated at 38. The restraint system 38 can be of many types, such as an air bag system, and the controller 36 sends output to the restraint system 38 based on the signals delivered by the electric circuit 34. Although an airbag restraint system is discussed here, one having ordinary skill in the art will recognize that the type of restraint system 38 connected to the controller 36 does not limit the scope of the present invention.

As shown, the system 28 also includes a plurality of low profile sensor assemblies 40 that are supported by the tray 30, below the lower surface 20 of the seat cushion 16. In one embodiment not shown, the lower surface 20 includes a plurality of depressions, and each of the low profile sensor assemblies 40 are spaced according to a corresponding depression formed in the lower surface 20 of the seat cushion 16.

A sensor, generally indicated at 42, is operatively fixed relative to each of the low profile sensor assemblies 40. The sensor is in electrical communication with the electric circuit 34. The low profile sensor assemblies 40 each cooperatively operate with the associated sensors 42 to detect a condition of the vehicle seat 10 as will be described in greater detail below. For example, the low profile sensor assemblies 40 and sensors 42 can operate to detect that the vehicle seat 10 is unoccupied, is occupied by a person of a particular weight, or is occupied by a person sitting in a particular position. As will be discussed in greater detail below, the sensor assemblies 40 can collapse in a more compact manner than similar sensor assemblies of the prior art. Advantageously, these low profile sensor assemblies 40 allow an occupant to sit more comfortably upon the vehicle seat 10.

Figure 4:
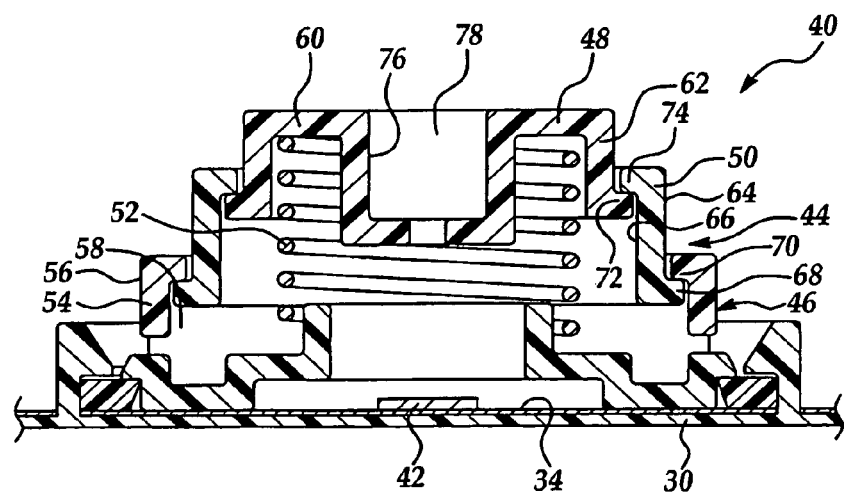
FIG. 4 is a cross-sectional side view of the sensor assembly employed in the vehicle occupant sensing system of the present invention.

One embodiment of the low profile sensor assembly 40 shown in FIG. 4. The low profile sensor assembly 40 generally includes a housing 44, having a base, generally indicated at 46, an upper slide member 48, and an intermediate guide member 50 disposed between the upper slide member 48 and the base 46. The upper slide member 48 and the intermediate guide member 50 are both supported for movement toward and away from the base 46. A biasing member 52 acts to bias the upper slide member 48 and intermediate guide member 50 away from the base 46 as will be described in greater detail below.

In the preferred embodiment illustrated in these figures, the base 46 includes a base guide 54, which is shaped like a hollow tube so as to define a wall 56 with a bore 58 extending axially therethrough. The upper slide member 48 includes an upper disc portion 60 and a support wall 62 extending axially downward from the outer circumference of the upper disc portion 60. The support wall 62 has a smaller diameter than the diameter of the intermediate guide member 50 such that the upper slide member 48 can move axially through the intermediate guide member 50. The biasing member 52 is disposed between the base 46 and the upper disc portion 60 of the upper slide member 48.

The intermediate guide member 50 is operatively supported for axial movement between the base 46 and the upper slide member 48. To this end, the intermediate guide member 50 is substantially tubular so as to define an outer surface 64 and an inner surface 60. The diameter of the intermediate guide member 50 is smaller than the diameter of the bore 58 of the base guide 54 such that the intermediate guide member 50 can move axially through the bore 58.

The intermediate guide member 50 is operatively supported for axial movement between the base 46 and the upper slide member 48. To this end, the intermediate guide member 50 is substantially tubular so as to define an outer surface 64 and an inner surface 66. The diameter of the intermediate guide member 50 is smaller than the diameter of the bore 58 of the base guide 54 such that the intermediate guide member 50 can move axially through the bore 58.

The upper slide member 48 includes a lower flange 72 formed on its lower end. On the other hand, the intermediate guide member 50 includes an upper flange 74 formed on its upper end. In the embodiment shown, the lower flange 72 of the upper slide member 48 extends radially outward, and the upper flange 74 of the intermediate guide member 50 extends radially inward. The diameter of the lower flange 72 is larger than the diameter of the upper flange 74. As such, the upper slide member 48 can be positioned within the intermediate guide member 50. As the lower flange 72 of the upper slide member 48 slides toward the upper flange 74 under the influence of the biasing force generated by the biasing member 52, the upper flange 74 interferes with the lower flange 72, thereby inhibiting further upward movement of the upper slide member 48. Thus, the upper flange 74 on the intermediate guide member 50 and the lower flange 72 on the upper slide member 48 cooperate to define the limit of sliding movement of the upper slide member 48 away from the base 46.

Furthermore, the upper slide member 48 includes a retainer 76 extending in the general direction of the base 46. In the embodiment shown, the retainer 76 is cup-shaped and extends from the center of the upper disc portion 60 of the upper slide member 48 in the direction of the base 46. In the embodiment shown in FIGS. 3 and 4, the sensor assemblies 40 include an emitter 78, such as a magnet, which is operatively contained in and supported by the retainer 76.

As noted above, the vehicle occupant sensing system 28 further includes at least one sensor 42. The sensor 42 is operatively supported by the circuit carrier 32 adjacent the sensor assembly 40. In the embodiment shown here, the sensor 42 is positioned below the base 46 of the sensor assembly 40. The sensor 42 can be one of many types, including but not limited to a Hall effect sensor. If the sensor 42 is a Hall effect sensor, it detects the change in magnetic flux caused by the movement of the emitter 78 within the upper slide member 48 of the sensor assembly 40, and the sensor 42 generates a signal correlative of this change in magnetic flux. In this way, the sensor 42 is adapted to detect a condition of the vehicle seat assembly 10, such as whether or not it is occupied or whether the occupant is sitting in a certain position, based on the response of the sensor assembly 40. The signals generated by the sensor 42 are carried through the electric circuit 34 to the controller 36, which send output to the restraint system 38 based on the signals generated by the sensor.

The weight of an occupant will deform the seat cushion 16 such that the lower surface 20 of the seat cushion 16 pushes the upper slide member 48 toward the base 46. As the upper slide member 48 moves, the sensor 42 detects an increase in magnetic flux density generated by the approaching emitter 78. In this way, the sensor 42 is operable to detect movement of the upper slide member 48 toward and away from the base 46. In turn, the sensor 42 generates a responsive signal indicative of the increase in flux density, and the controller 36 sends output to the restraint system 38 based on these signals. In the preferred embodiment, the sensor assemblies 40 are of the type described in detail in applicant's co-pending patent application Ser. No. 10/748,536, entitled "Vehicle Occupant Sensing System Having a Low Profile Sensor Assembly," and which is incorporated herein in its entirety by reference. Also, in the preferred embodiment, the sensors 42 and their method of attachment are of a type described in detail in applicant's co-pending patent application Ser. No. 10/748514, entitled "Vehicle Occupant Sensing System and Method of Electrically Attaching a Sensor to an Electrical Circuit," and which is incorporated herein in its entirety by referece.

As described above, the assembly 14 has a seat pan 21 which includes a substantially flat main body 80 that defines a forward portion 82 and a rear portion 84. The seat pan 26 is positioned such that the rear portion 84 is disposed closer to the seat back 12 than the forward portion 82. The rear portion 84 of the seat pan 26 is substantially horizontal and parallel to the upper surface 18 of the seat cushion 16. Also, the forward portion 82 of the seat pan 26 is disposed at a positive angle relative to the horizontal plane of the rear portion 84 of the seat pan 26. Angling the forward portion 82 allows the seat pan 26 to more effectively bear forward inertial loads of the occupant during a sudden deceleration, such as those experienced in a frontal collision. This reduces the risk of injury otherwise caused when the forward inertial loads force the occupant off of the front of the seat cushion 16 and is one example of a design component calculated for compliance with governmental motor vehicle safety standards, such as 49 C.F.R. §§ 571.207-208 (2003).

The seat pan 26 also includes at least one bolster 86. In the embodiment shown, there are two bolsters 86 which each extend upward toward the lower surface 20 of the seat cushion 16, and each are formed spaced from the main body 80 of the seat pan 26. Specifically, each bolster 86 is attached to opposite sides of the main body 80 so as to be disposed under the inboard side 22 and outboard side 24 of the seat cushion 16, respectively.

As noted above, the vehicle seat assembly 10 includes a circuit carrier tray 30. The tray 30 is adapted to be disposed between the seat pan 26 and the seat cushion 16. In one embodiment, the tray 30 is made out of a rigid plastic material. The tray 30 has a main body portion 88 that is substantially flat and shaped so as to correspond with the main body 80 of the seat pan 26. Specifically, the main body portion 88 of the tray 30 includes a rear portion 90 that is substantially horizontal and parallel to the upper surface 18 of the seat cushion 20 so as to correspond to the rear portion 84 of the seat pan 26. The main body portion 88 of the tray 30 also includes a forward portion 92 that is disposed at a positive angle relative to a horizontal plane of the rear portion 90 of the tray 30 so as to correspond to the forward portion 82 of the seat pan 26.

The tray 30 also includes at least one bolster 94. In the embodiment shown, there are two bolsters 94, each L-shaped so as to define a vertical portion 96 and a horizontal portion 98. The vertical portion 96 of each bolster 94 is attached at opposite sides of the main body portion 88 such that the horizontal portion 98 of each bolster 94 is spaced vertically from the main body portion 88 of the tray 30. The tray 30 is positioned such that each bolster 94 corresponds with at least one bolster 86 of the seat pan 26.

More specifically, the tray 30 is positioned on the seat pan 26 such that the main body portion 88 of the tray 30 lays flat on the main body 80 of the seat pan 26 and the horizontal portion 98 of each bolster 94 of the tray 30 extends upward to lay flat on the corresponding bolster 86 of the seat pan 26.

Moreover, the tray 30 includes a plurality of pedestals 100 formed thereon. At least some of the pedestals 100 are formed on the forward portion 92 of the tray 30. In the preferred embodiment shown here, the pedestals 100 are tubular-shaped and each pedestal 100 extends vertically from the forward portion 92 of the tray 30. The pedestals 100 each define a substantially flat top surface 102 spaced away from the main body portion 88 of the tray 30. In the embodiment shown, each pedestal 100 extends at a positive angle relative to the plane of the forward portion 92 such that the plane of each top surface 102 is substantially parallel with the rear portion 90 of the tray 30. Although the pedestals 100 are shown integrally attached to the tray 30, one having ordinary skill in the art will recognize that the pedestals 100 could be separate from the rest of the tray 30 without departing from the spirit of the invention.

In the preferred embodiment, a pedestal 100 is also formed on each bolster 94. Specifically, this pedestal 100 is defined near the rear of the horizontal portion 98 of each bolster 94. The pedestals 100 on the bolsters 94 extend at a positive angle relative to the plane of the rear of the horizontal portion 98 of the respective bolster 94 such that the top surface 102 of these pedestals 100 are substantially parallel with the rear portion 90 of the tray 30.

As shown in FIG. 1, the circuit carrier 32 also includes a plurality of slits 104 extending through the circuit carrier 32 such that each slit 104 defines a flap 106 of the circuit carrier 32. Each of the slits 104 is cut in the form of a partial ellipse and is spaced according to the spacing of the pedestals 100. As such, when the circuit carrier 32 is positioned on the tray 30, the flaps 106 of the circuit carrier 32 lay directly on the top surface 102 of each pedestal 100 while the remaining portions of the circuit carrier 32 lies flat on the remaining portions of the tray 30.

In the embodiment shown, the sensor assemblies 40 are positioned on the rear portion 90, the forward portion 92, and on the bolsters 94 of the tray 30. At least some of the sensor assemblies 40 positioned on the forward portion 92 of the tray 30 are positioned on the top surface 102 of the pedestals 100. The sensor assemblies 40 positioned on the rear of the bolsters 94 are also positioned on the top surface 102 of the respective pedestals 100. Specifically, in the embodiment shown, each of the pedestals 100 supports one sensor assembly 40.

The tray 30 supports each sensor assembly 40, with the upper slide member 48 in close proximity to the lower surface 20 of the seat cushion 16. As noted above, when an occupant sits on the upper surface 18 of the seat cushion 16, the occupant's weight transfers through the seat cushion 16, causing the lower surface 20 to move toward the upper slide members 48 and depress them into the respective base 46. Movement of the upper slide members 48 causes the respective sensors 42 to generate the correlating signals, which are sent through the electric circuit 34 to the controller 36. The controller 36 sends output to the restraint system 38 based on these signals.

Thus, the vehicle occupant sensing system 28 responds when an occupant is present in the vehicle seat assembly 10 because some or all of the upper slide members 48 are depressed, and a person of a certain weight will depress the upper slide members 48 a predetermined amount, causing a predetermined signal response from the sensors 42. Similarly, when the vehicle seat assembly 10 is vacant, all of the sensor assemblies 40 are at a free height, causing another predetermined signal response from the sensors 42. Also, when the occupant is seated in a certain way, a number of upper slide members 48 are depressed in a certain pattern, causing a predetermined signal response from the sensors 42. In this way, the sensor assemblies 40 are responsive to the condition of the vehicle seat assembly 10, and the controller 36 can send output to the restraint system 38 based on these predetermined signal responses. However, one having ordinary skill in the art will recognize that the vehicle occupant sensing system 28 could be responsive to any one of a plurality of vehicle seat conditions without limiting the present invention.

Figure 2:
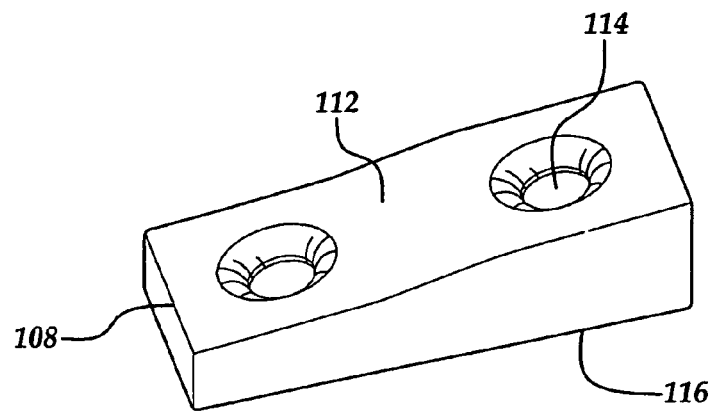
FIG. 2 is a bottom perspective view of the reinforcement inserts of the present invention.

As shown in FIGS. 1 and 2, the vehicle seat assembly 10 includes at least one reinforcing insert 108. In the embodiment shown, there are two reinforcing inserts 108, each having a block-type shape. In one embodiment, the reinforcing inserts 108 are made out of a material having a higher density than that of the seat cushion 16. For example, the reinforcing inserts 108 can be made out of plastic, non-woven fabric, expanded bead foam, or urethane foam. However, the reinforcing inserts 108 can be made out of any other reinforcing material without departing from the spirit of the invention.

The reinforcing inserts 108 are disposed between at least one of the sensor assemblies 40 and the lower surface 20 of the seat cushion 16. The reinforcing inserts 108 correspond with the bolster 86 of the seat pan 26, positioned adjacent at least one of the inboard side 22 and the outboard side 24 of the seat cushion 16.

The seat cushion 16 includes at least one recess shown in phantom in FIG. 1 and indicated at 110. In one preferred embodiment illustrated here, there are two recesses 110, each formed on the lower surface 20 of the seat cushion 16. Each recess 110 is generally rectangular and extends upward toward the upper surface 18 of the seat cushion 16. One recess 110 is positioned adjacent the inboard side 22 of the seat cushion 16, and the other recess 110 is positioned adjacent the outboard 24 side. As such, the recesses 110 in the seat cushion 16 are adapted to receive the reinforcing inserts 108 such that the reinforcing inserts 110 fit snugly therein.

Moreover, at least one of the upper slide members 48 of the sensor assemblies 40 engages with the respective reinforcing inserts 108. Specifically, the two upper slide members 48 of the sensor assemblies 40 positioned adjacent the inboard side 22 of the seat cushion 16 engage with the reinforcing insert 108 positioned on the inboard side 22. Similarly, the two upper slide members 48 of the sensor assemblies 40 positioned adjacent the outboard side 24 of the seat cushion 16 engage with the reinforcing insert 108 positioned on the outboard side 24.

In the embodiment shown FIG. 2, an underside 112 of the reinforcing insert 108 is stepped. As such, the underside 112 of the reinforcing insert 108 can sit level on both engaging sensor assemblies 40. Specifically, the sensor assembly 40 attached further to the back of the tray 30 sits slightly higher than the other sensor assembly 40, and the stepped underside 112 of the reinforcing insert 108 accommodates for the unequal heights of the upper slide members 40 of the respective sensor assemblies 40 that engage with the reinforcing insert 108.

Furthermore, as shown in FIG. 2, the reinforcing insert 108 includes at least one indent 114 adapted to receive at least one of the sensor assemblies 40. In the embodiment shown, the reinforcing insert 108 includes two indents 114, each circular in shape and extending upward from the underside 112 in a direction normal to a topside 116 of the reinforcing insert 108. The reinforcing insert 108 is positioned such that the two upper slide members 48 are both received by the indents 114 on the respective reinforcing insert 108. Preferably, the shape and positioning of the reinforcing insert 108 is such that when the vehicle seat assembly 10 is vacant, the reinforcing inserts 108 do not depress the upper slide members 48 into the corresponding bases 46.

Figure 3:
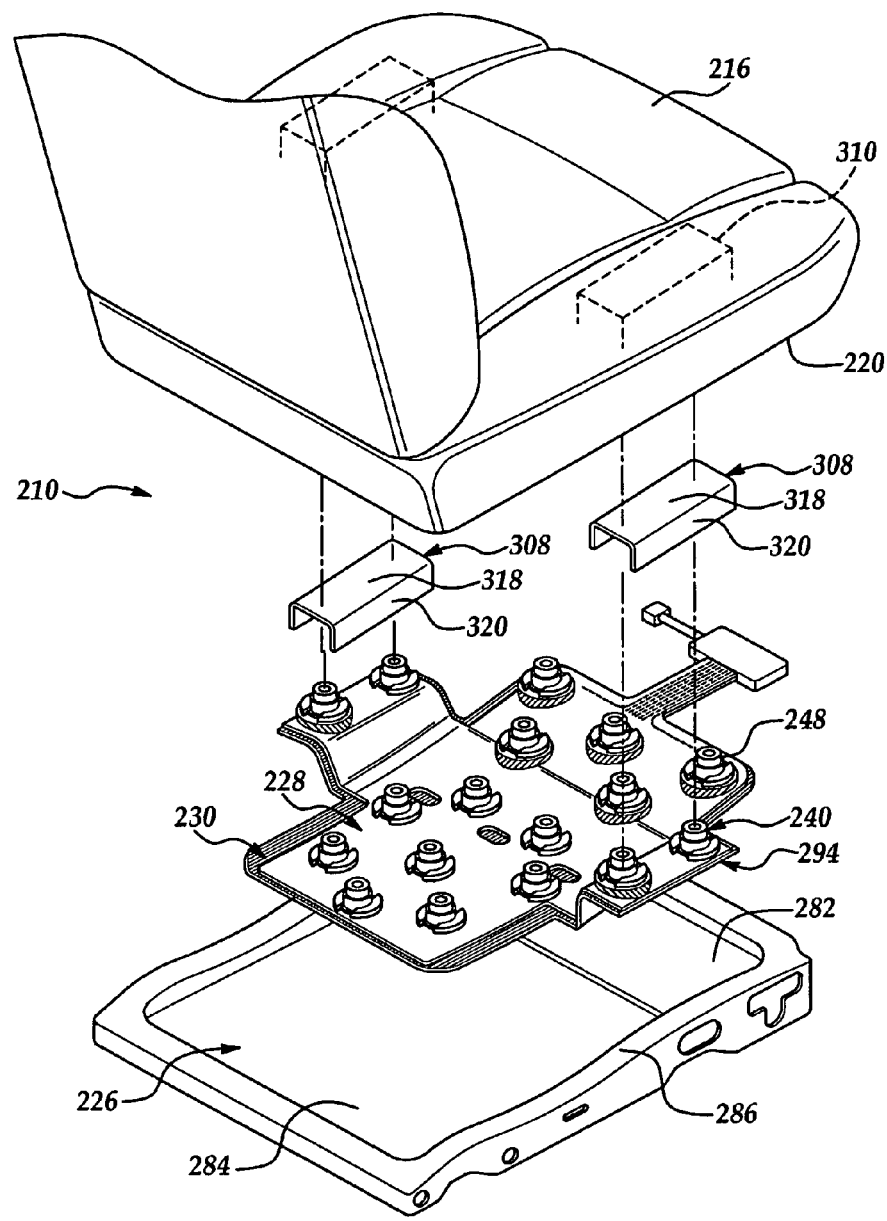
FIG. 3 is a top perspective view of another embodiment of the reinforcement inserts of the present invention.

Turning now to FIG. 3, a second embodiment of a vehicle seat assembly is generally indicated at 210 where like numerals increased by 200 are used to designate like structure with respect to the embodiment illustrated in FIGS. 1 and 2. The seat cushion 216, lower surface 220, forward portion 282 of the seat pan 226, rear portion 284 of the seat pan 226, bolster 294 of the tray 230, and vehicle occupant sensing system 228 are substantially similar to those described in relation to FIG. 1. Accordingly, that description is not repeated here.

As shown, the vehicle seat assembly 210 includes a reinforcing insert 308 having a U-shaped cross section. As such, the reinforcing insert 308 defines an engaging member 318 and two flanges 320. The two flanges 320 extend perpendicularly from opposing sides of the engaging member 318. The reinforcing insert 308 is positioned in the recesses 310 of the seat cushion 216 such that the flanges 320 point away from the seat cushion 216. As such, the flanges 320 are disposed on either side of the sensor assemblies 240 positioned above the bolsters 286 of seat pan 226, and the engaging member 318 is leveled above the corresponding upper slide members 248.

Both embodiments of the reinforcing insert 108, 308 protects the softer foam of the seat cushion 16, 216 from premature wear caused by repetitive pressure from the harder material of the sensor assemblies 40, 240 occurring when an occupant sits on the seat cushion 16, 216. As the occupant sits on the vehicle seat assembly 10, 210 the sensor assemblies 40, 240 press up toward the seat cushion 16, 216 but because of the reinforcing insert 108, 308 pressure from the sensor assemblies 40, 240 can be more evenly distributed on the seat cushion 16, 216 such that the seat cushion 16, 216 is less likely to wear over time. Advantageously, the sensor assemblies 40, 240 are less likely to detrimentally affect the comfort level of the vehicle seat assembly 10, 210.

The embodiments shown have reinforcing inserts 108, 308 positioned at the inboard side 22, 222 and outboard side 24, 224 of the seat cushion 16, 216. Because of the bolsters 86, 286 of the seat pan 26, 226 there is a reduced amount of foam thickness separating the occupant from the sensor assemblies 40, 240 adjacent the inboard side 22, 222 and outboard side 24, 224. However, the reinforcing inserts 108, 308 more evenly distribute the pressure from the sensor assemblies 40, 240 on the seat cushion 16, 216 in these areas such that wear to the seat cushion 16, 216 is less likely and comfort level of the vehicle seat assembly 10, 210 is unlikely to be detrimentally affected. It is noted, however, that the reinforcing inserts 108, 308 can be positioned anywhere between the seat cushion 16, 216 and the sensor assemblies 40, 240 without departing from the spirit of the invention.

The present invention, has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle seat assembly comprising:
   a lower seat cushion with an upper surface and a lower surface;
   a plurality of sensor assemblies positioned adjacent said lower surface of said lower seat cushion, said sensor assemblies responsive to a condition of said lower seat cushion; and
   at least one reinforcing insert disposed between at least one of said sensor assemblies and said lower surface of said lower seat cushion, said at least one reinforcing insert having at least one indent adapted to receive at least one of said sensor assemblies,
   wherein said lower surface includes at least one recess formed therein that is adapted to receive said at least one reinforcing insert.

2. A vehicle seat assembly as set forth in claim 1, wherein said at least one reinforcing insert is made out of a material chosen from a group consisting of plastic, non-woven fabric, expanded bead foam and urethane foam.

3. A vehicle seat assembly as set forth in claim 1, wherein said sensor assemblies each comprise a housing including a base and an upper slide member supported for movement toward and away from said base, wherein at least one of said upper slide members engages said at least one reinforcing insert.

4. A vehicle seat assembly as set forth in claim 1, wherein said at least one indent is circular in shape.

5. A vehicle seat assembly as set forth in claim 1, wherein said at least one reinforcing insert has a U-shaped cross section.

6. A vehicle seat assembly as set forth in claim 1, wherein said lower seat cushion defines an inboard and an outboard side, and wherein said at least one reinforcing insert is positioned adjacent at least one of said inboard side and said outboard side of said lower seat cushion.

7. A vehicle seat assembly comprising:
   a lower seat cushion with an upper surface and a lower surface;
   a plurality of sensor assemblies positioned adjacent said lower surface of said lower seat cushion, said sensor assemblies responsive to a condition of said lower seat cushion, said sensor assemblies each comprise a housing including a base and an upper slide member supported for movement toward and away from said base; and
   at least one reinforcing insert disposed between at least one of said sensor assemblies and said lower surface of said lower seat cushion,
   wherein said lower surface includes at least one recess formed therein that is adapted to receive said at least one reinforcing insert and at least one of said upper slide members engages said at least one reinforcing insert.

8. A vehicle seat assembly as set forth in claim 7, wherein said at least one reinforcing insert is made out of a material chosen from a group consisting of plastic, non-woven fabric, expanded bead foam and urethane foam.

9. A vehicle seat assembly as set forth in claim 7, wherein said at least one reinforcing insert has a U-shaped cross section.

10. A vehicle seat assembly as set forth in claim 7, wherein said lower seat cushion defines an inboard and an outboard side, and wherein said at least one reinforcing insert is positioned adjacent at least one of said inboard side and said outboard side of said lower seat cushion.

11. A vehicle seat assembly comprising:
a lower seat cushion with an upper surface and a lower surface;
a seat pan adapted to operatively support said lower seat cushion, said seat pan having a bolster that extends upward from said seat pan toward said lower surface;
a plurality of sensor assemblies positioned adjacent said lower surface of said lower seat cushion, said sensor assemblies responsive to a condition of said lower seat cushion; and
at least one reinforcing insert disposed between at least one of said sensor assemblies and said lower surface of said lower seat cushion,
wherein said lower surface includes at least one recess formed therein that is adapted to receive said at least one reinforcing insert and said at least one reinforcing insert corresponds to said bolster.

12. A vehicle seat assembly as set forth in claim 11, wherein said at least one reinforcing insert includes at least one indent adapted to receive at least one of said sensor assemblies.

13. A vehicle seat assembly as set forth in claim 12, wherein said at least one indent is circular in shape.

14. A vehicle seat assembly as set forth in claim 11, wherein said at least one reinforcing insert has a U-shaped cross section.

15. A vehicle seat assembly as set forth in claim 11, wherein said lower seat cushion defines an inboard and an outboard side, and wherein said at least one reinforcing insert is positioned adjacent at least one of said inboard side and said outboard side of said lower seat cushion.

16. A vehicle seat assembly as set forth in claim 10, wherein said sensor assemblies each comprise a housing including a base and an upper slide member supported for movement toward and away from said base, wherein at least one of said upper slide members engages said at least one reinforcing insert.

17. A vehicle seat assembly as set forth in claim 11, wherein said at least one reinforcing insert is made out of a material chosen from a group consisting of plastic, non-woven fabric, expanded bead foam and urethane foam.

* * * * *